(12) United States Patent
Dent

(10) Patent No.: US 11,070,053 B2
(45) Date of Patent: Jul. 20, 2021

(54) FAST FAULT CURRENT LIMITER

(71) Applicant: Koolbridge Solar, Inc., Wrightsville Beach, NC (US)

(72) Inventor: Paul Wilkinson Dent, Pittsboro, NC (US)

(73) Assignee: Koolbridge Solar, Inc., Wrightsville Beach, NC (US)

( * ) Notice: Subject to any disclaimer, the term of this patent is extended or adjusted under 35 U.S.C. 154(b) by 196 days.

(21) Appl. No.: 16/412,053

(22) Filed: May 14, 2019

(65) Prior Publication Data

US 2020/0366086 A1    Nov. 19, 2020

(51) Int. Cl.
*H02H 9/00*       (2006.01)
*H02H 9/02*       (2006.01)
*H01H 71/24*      (2006.01)

(52) U.S. Cl.
CPC ........ *H02H 9/005* (2013.01); *H01H 71/2409* (2013.01); *H02H 9/02* (2013.01)

(58) Field of Classification Search
CPC .......... H02H 9/005; H02H 9/02; H02H 9/021; H02H 3/025; H02H 3/08; H01H 71/2409
USPC ...................................................... 361/93.9
See application file for complete search history.

(56) References Cited

U.S. PATENT DOCUMENTS

| | | | | |
|---|---|---|---|---|
| 5,751,530 | A  * | 5/1998 | Pelly ........................ | H02H 3/00 361/35 |
| 2005/0185353 | A1* | 8/2005 | Rasmussen ............ | H05B 39/00 361/93.9 |
| 2015/0115913 | A1* | 4/2015 | Stewart ................... | H02M 1/38 323/271 |

* cited by examiner

*Primary Examiner* — Kevin J Comber
(74) *Attorney, Agent, or Firm* — Coats & Bennett, PLLC

(57) ABSTRACT

A fast-operating AC fault current limiter, to limit the fault current let through to downstream equipment during short circuit or low-impedance faults, comprises a series inductor to limit current rise time, a current sensor to sense the instantaneous current, a series AC semiconductor switch to interrupt current flow when it exceeds the maximum desired fault current, and a shunt AC semiconductor switch to catch inductor flyback voltage when the series semiconductor switch is opened. Each of the series and the shunt AC switches comprises two back-to-back MOSFETs. Inventive control of timing of the individual MOSFETs obviates the need for exact simultaneous timing of opening the series switch and closing the shunt switch, which is otherwise required to avoid short circuits.

21 Claims, 4 Drawing Sheets

MORE DETAILED DIAGRAM OF THE INVENTION

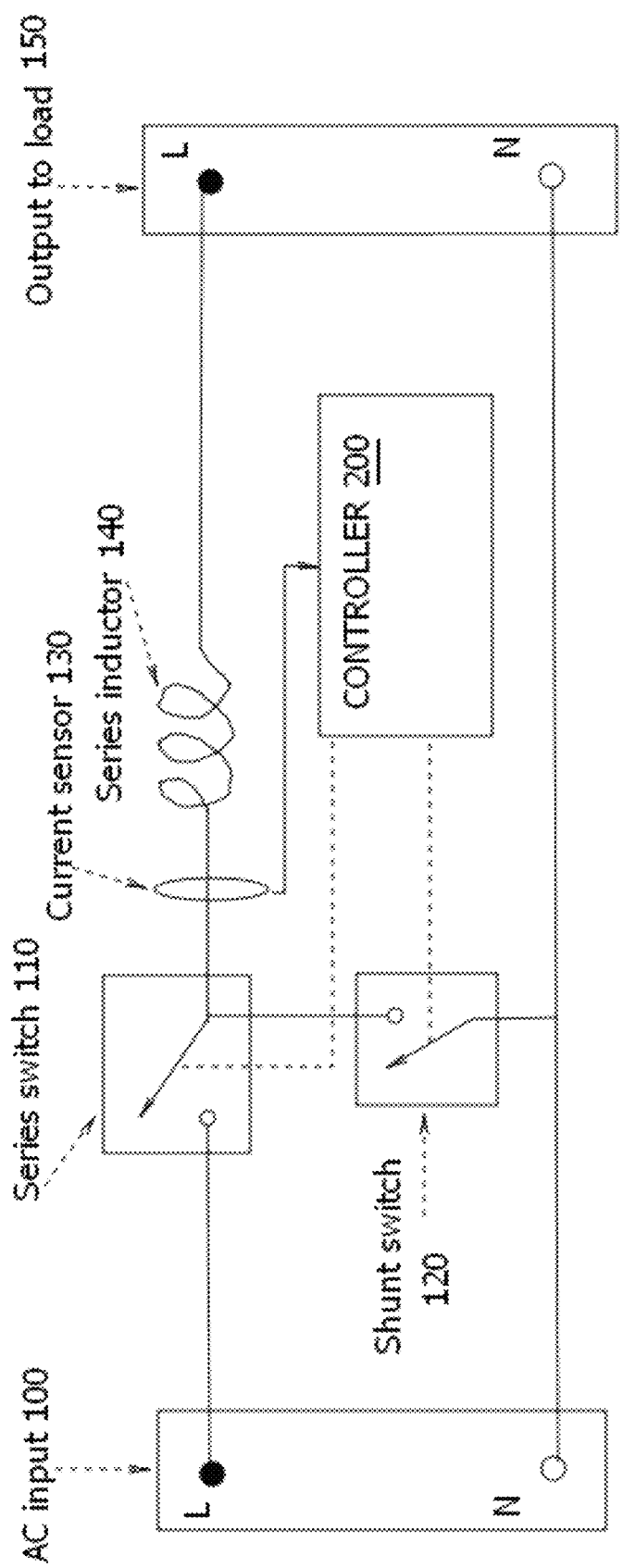
FIGURE 1: SIMPLIFIED CONCEPT OF THE INVENTION

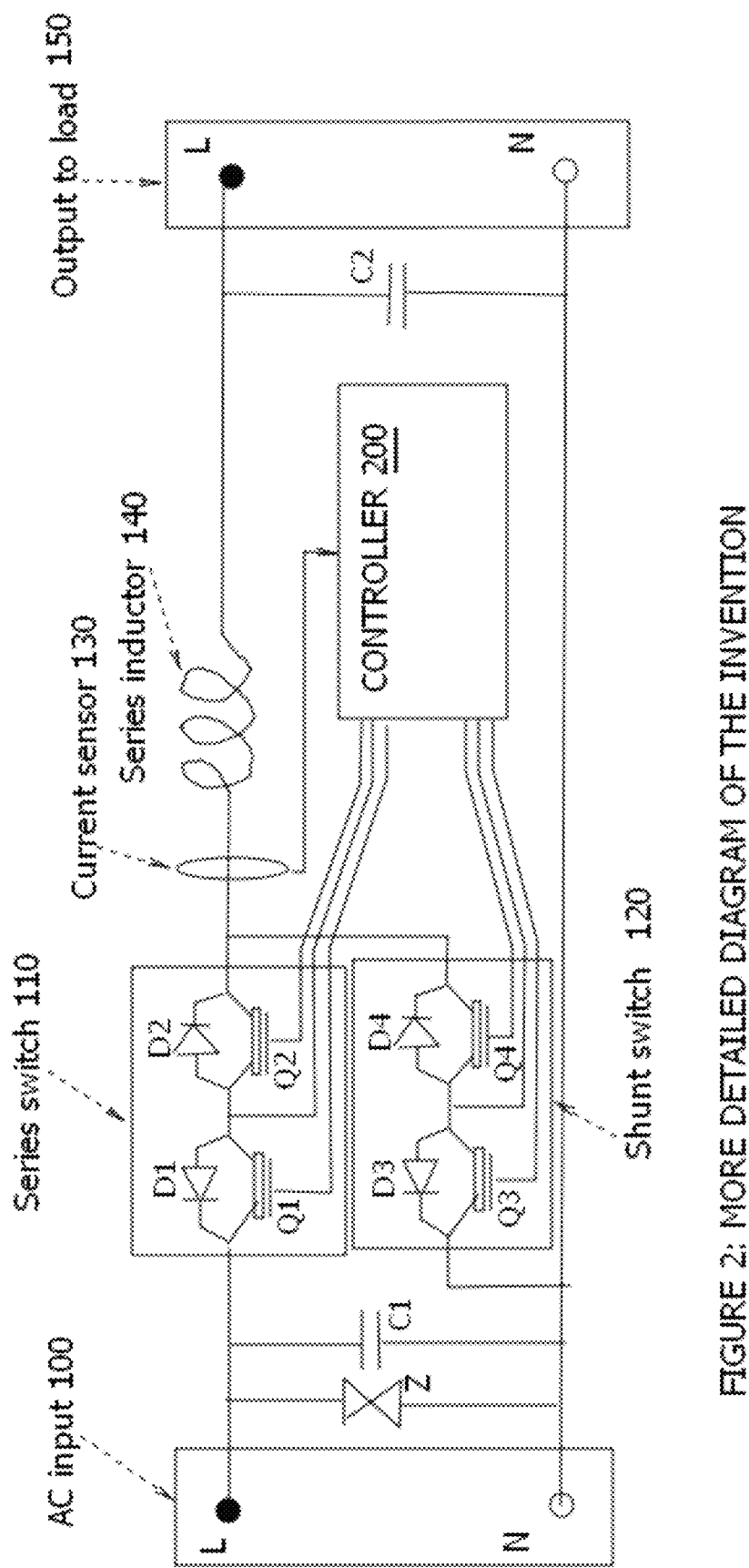
FIGURE 2: MORE DETAILED DIAGRAM OF THE INVENTION

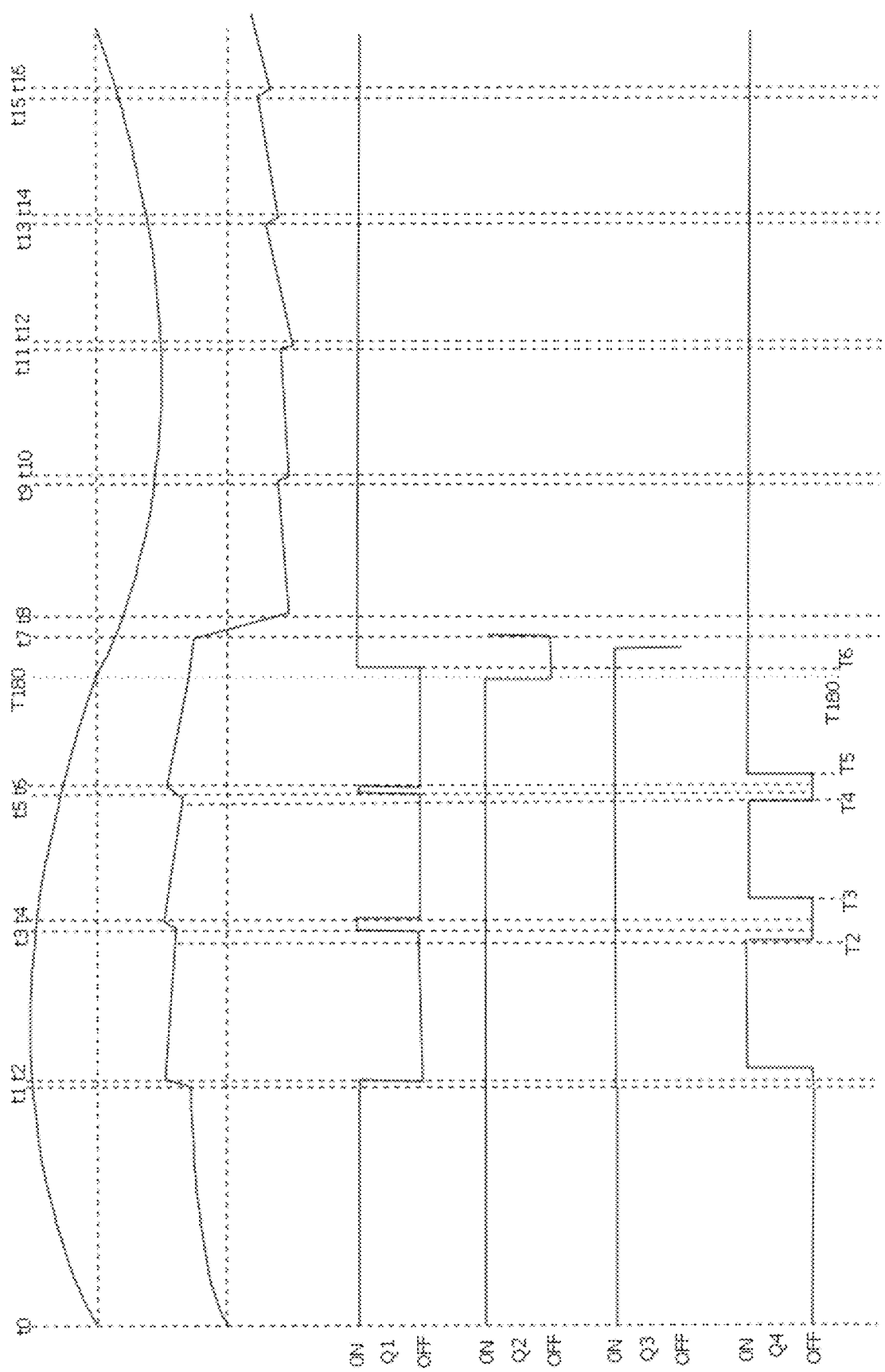

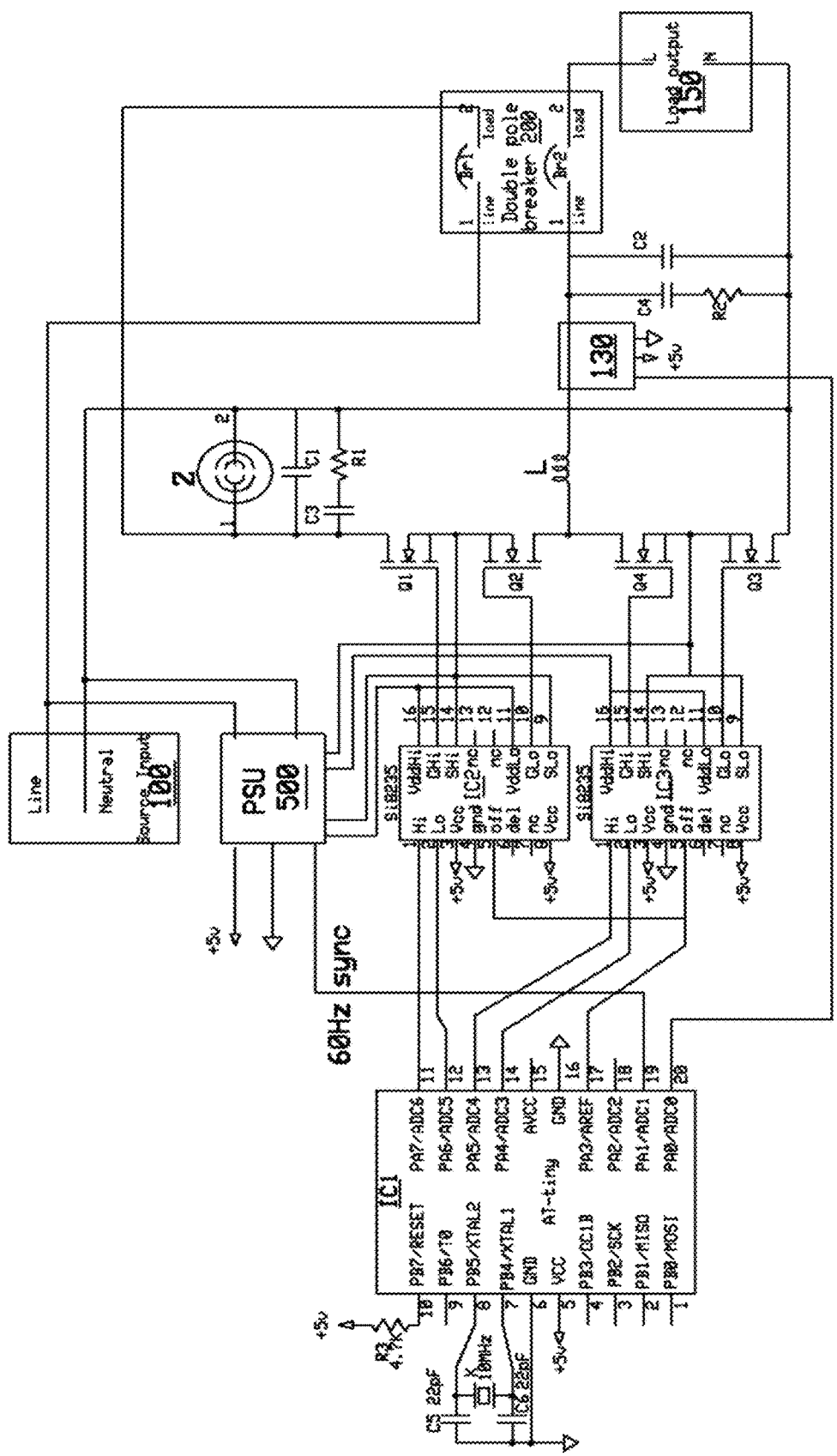
FIGURE 4: EXEMPLARY CIRCUIT OF A FAULT CURRENT LIMITER

FAST FAULT CURRENT LIMITER

FIELD OF INVENTION

The present invention relates generally to electrical power circuits, and in particular to a fast breaker circuit that limits the fault current which conventional electro-mechanical circuit breakers let through to downstream circuits due to their slow trip action.

BACKGROUND

Electrical safety is ensured by, among other things, the use of Over-Current Protection Devices (OCPD), such as fuses and circuit breakers. Both fuses and circuit breakers rely on a physical or mechanical change, and thus take a finite time, e.g., on the order of milliseconds, to interrupt the flow of an abnormal current. When a dead short-circuit condition occurs, before the OCPD operates to interrupt the current, the abnormal current is limited only by wire resistances. These can be small for locations near the utility pole transformer, and so the abnormal current can reach thousands of amperes for the few milliseconds it takes for the OCPD to operate. Utilities typically include deliberate leakage inductance in residential pole transformers to limit the short circuit current for a normal 120-0-120 volt Alternating Current (AC) split phase residential supply to 5000 amperes. For commercial installations using 120/208 volt three phase power, the deliberate transformer limitation may be 10,000 amperes The damage potential of momentary high fault currents may be caused by magnetic forces that can bend conductors, or by the heating effect. The heating effect is proportional to the integral of current squared times time, or $I^2t$. A regular residential thermo-magnetic circuit breaker takes about 4 mS to trip, and so allows through an $I^2t$ of $5000\times5000\times4/1000=100,000\ A^2S$. A fuse can blow considerably faster, and the let-through of a fast fuse may be less than $10,000\ A^2S$. Nevertheless, it is an onus on downstream equipment such as wiring, switch contacts and the like to have the ability to tolerate such high $A^2S$ let-through.

There is therefore a need in the art for a fault current limiting device with lower let-through in order to simplify downstream equipment—either by limiting the fault current, reducing the trip time, or both. It is not practical to limit the current by use of series resistance due to the enormous power dissipation that would be involved. In the prior art, it is known to regulate a Direct Current (DC) by means of a substantially lossless switch-mode regulator, but DC switch-mode techniques do not directly port to AC applications. Consequently, there is the need for an AC current limiting technique that addresses one or more of these limitations.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

An inventive fault current limiter comprises at its core a small inductor in the 50 uH region in series with the output to the load for limiting the rate of increase of load current output during fault conditions; a fast current sensor for sensing the instantaneous inductor current; a fast-operating series AC switch for opening the supply path to the inductor in response to the sensed inductor current, and other components for handling inductor flyback EMF and high frequency suppression.

At normal currents, the AC semiconductor switch allows through the supply current with only a small voltage drop (in the tens to hundreds of millivolts region), and dissipates little power. When the current sensor detects a current greater than a threshold value, the series AC switch opens and the series inductor following the series switch is shorted to ground with a shunt AC switch. The inductor energy then decays into the load through the shunt switch until the current is less than the threshold, and the series switch closes again while the shunt switch simultaneously opens in a repeating cycle, resulting in a high frequency switching oscillation. This switching action maintains the load current oscillating around the threshold value, with low power dissipation due to an AC switch-mode regulator action. Filter capacitors limit the export of high switching frequency components. The current threshold value can be made dependent on the supply voltage, so that the waveform of current taken from the supply follows the supply voltage waveform. The above switching action is allowed to limit the fault current for a brief, predetermined time before the device shuts down to await a manual reset. The shutdown may be accomplished by means of a regular thermo-magnetic breaker on the load side, and optionally ganged to a like breaker on the supply side, or may be done additionally or alternatively by electronically timing the shutdown instant at which the series switch is permanently opened. In the latter case, the electro-mechanical breakers may be forced to trip also, thereby de-energizing the whole circuit to await manual reset.

One embodiment relates to fault current limiting circuit operative to limit an instantaneous fault current, let through from an alternating current source to a load, to a maximum desired value under fault conditions. The fault current limiting circuit includes an inductor in series with the current path from source to load operative to limit a rate of rise of current under fault conditions. The fault current limiting circuit also includes a first semiconductor switch in series with the current path from source to load comprising two series transistors connected in reverse so as to be controlled to close and pass alternating current with low voltage drop, or to be opened to block alternating current flow from said alternating current source. The fault current limiting circuit further includes a second semiconductor switch in shunt with the electrical path from said source to said load, the second semiconductor switch being controllable to maintain current flow through said inductor in one or both of a first direction and a second direction, when said first semiconductor switch is opened, thereby limiting the development of inductor flyback voltages. The fault current limiting circuit additionally includes a current sensor operative to sense instantaneous current flowing through said inductor and further operative to output a signal output indicative of the instantaneous current. Finally, the fault current limiting circuit includes a controller operative to receive said output signal from said current sensor and further operative to control the two transistors of said first semiconductor switch and said second semiconductor switch to limit fault current to a predetermined value when said load exhibits a low impedance, by repetitively opening and closing said first semiconductor switch in a sequence to control the mean current flow.

Another embodiment relates to a method of limiting instantaneous fault current in an electrical power supply circuit between an alternating current (AC) source and a load. An inductor is provided in series with the current path from source to load, and is operative to limit a rate of rise of current under fault conditions. An instantaneous current flowing through the inductor is sensed. If the instantaneous current exceeds a maximum desired value, a switch in series with the inductor is opened to block current flow from the source, and a shunt switch between the inductor and a current return path to the source is closed to maintain current flow through the inductor when the series switch is opened, thereby limiting the development of inductor flyback voltages. The switch actuations are timed such that the switches are never simultaneously both open or both closed.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 is a block diagram of a fast current-limiting circuit breaker.

FIG. 2 is a block diagram depicting one implementation of the switches of the fast current-limiting circuit breaker of FIG. 1.

FIG. 3 is a timing diagram depicting switch timings for a positive half-cycle of AC current.

FIG. 4 is an electrical schematic diagram of one implementation of the fast current-limiting circuit breaker of FIG. 1.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

FIG. 1 illustrates the simplified concept of the inventive fault current limiter. An AC input (100) receives a Live and a Neutral conductor from a source, such as the utility grid. The current from the Live input passes through series AC switch (110), current sensor (130), and series inductor (140) to the load output (150). When the series AC switch (110) is closed by a control signal from controller (200), current from input (100) passes to load output (150), with very little voltage drop, through series AC switch (110) and inductor (130). The purpose of inductor (140) is to limit the rate of increase of fault current when the load becomes excessive or in a short circuit condition, in order to give controller (200) time to mitigate the fault condition by limiting the current.

A signal indicative of the current is coupled from the current sensor to controller (200), and when the current indicated is greater than a desired maximum threshold current value, controller (200) controls series AC switch (110) to open, breaking the current path from input to output.

It is a well-known property of inductors that the current cannot be interrupted instantaneously. Attempts to do so cause the collapsing magnetic field in the inductor to generate a back-EMF (electro-magnetic force) of such a polarity and at as high a voltage as necessary as to maintain the current flow, including by sparking over switch (110) if necessary. The latter is undesirable, potentially damaging the switch; therefore, simultaneously with opening AC switch (110), the controller (200) closes shunt AC switch (120) to the Neutral line, to catch the flyback-EMF from inductor (140) and to thus maintain the inductor current flow through the AC shunt switch (120) path to Neutral. The current then decays as the inductor energy transfers to the load (150), and when the current sensed by current sensor (130) has dropped to a value below the maximum desired threshold value, controller (200) will open shunt switch (120) and simultaneously re-close switch (110). In this manner, controller (200) creates a repeating cycle at a much higher frequency than the 50 or 60 HZ line frequency, depending on the inductance of inductor (140). Thus, the current is caused to oscillate around the threshold current, for as long as the load is drawing a current greater than the threshold current. The fault current is thus instantaneously limited to around the threshold current. This condition may be allowed to persist for a determined time before controller (200) opens switch (110) permanently to await a manual reset.

Current sensor (130) can for example be a Hall Effect sensor, which senses the magnetic field produced by current flowing in a nearby wire. Some Hall Effect sensors on the market utilize a high-frequency AC drive to the Hall Effect sensor to eliminate DC offset problems, but this technique reduces the speed of response. For the present invention, a fast response is more important, and the Hall Effect sensor can be incorporated with the series inductor, for example in the magnetic core gap, which will provide it with a much higher magnetic field to sense, reducing the significance of DC offset and allowing DC coupling of the Hall Effect device. The magnetic core of the inductor is almost certainly gapped in order to avoid saturation at a high fault current level. A possible alternative current sensor is a small series resistor, the voltage drop across which is amplified using an opto-isolating amplifier to obtain an output dependent on the current that is relative to microcontroller ground.

In FIG. 1, the simultaneity of opening switch (110) and closing switch (120) is important. If switch (110) is opened before switch (120) is closed, switch (110) may be destroyed by the unlimited flyback EMF from inductor (140). Alternatively, if switch (120) is closed before series switch (110) is opened, L will be shorted to N resulting in an unlimited current that could destroy both switches. The more detailed description that follows therefore discloses how to configure and control the AC switches to avoid the need for absolute simultaneity in switching.

FIG. 2 shows more detail of one embodiment of the present invention. Each AC switch is now shown to be composed of two back-to-back, series connected MOSFETs labelled (Q1, Q2) in the case of series AC switch (110) and (Q3, Q4) in the case of shunt switch (120). The MOSFETs may be P-type or N-type and may be connected drain-todrain or source-to-source. If connected source-to-source, the common source connection is the reference potential for applying a gate drive voltage to either transistor, so only three connections from each switch to controller (200) are necessary. Thus it may be deduced that FIG. 2 illustrates the source-to-source, back-to-back connection of the MOSFETs. MOSFETs embody intrinsic diodes connecting drain to source (D1, D2, D3, D4), and based on the diode polarity shown in FIG. 2, it may also be deduced that the illustrated transistors are N-type MOSFETs.

The gate drive voltages produced by controller (200) for Q1 and Q2 of switch (110) must be relative to the common source connection of Q1 and Q2 while the gate drives for Q3 and Q4 of switch (120) must be relative to the common source connection of Q3 and Q4. Since the two common source connections are not at the same potential, and in fact vary with the AC input, isolating gate drivers are needed to produce gate drive voltages that are isolated as between the two switches, and possibly also from the controller reference potential, which may be ground or neutral. Isolating gate drivers are available at the state of the art and may in some cases use opto-isolation techniques. If drain-to-drain, back-to-back connections of the MOSFETs are used to form an AC switch, since the two sources of the same switch will no longer be at the same potential all the time, two isolated gate driver domains will be needed for each switch, including isolated gate driver supplies of about 12 volts each, while common source connection requires only one isolated gate drive supply per switch. By noting that, in the drain-to-drain connection, the source of Q4 of the shunt switch would be common with the source of Q2 of the series switch, the number of isolated gate-drive domains could be reduced to three—one for Q1, one for Q3, and a third for Q2 plus Q4. The following description will be based on the source-to-source, back-to-back connection of N-type MOSFETs as shown in FIG. 2; however those of ordinary skill in the art may readily adapt the teachings herein to other transistor types and connection topologies.

To close AC switch (110) and pass current to the load, both Q1 and Q2 are turned on by applying, for example, about +10 volts to the gates of Q1 and Q2, relative to their common sources. The two ON MOSFETs then present a series loss impedance measured only in milliohms. For a 120 volt AC device, the peak input voltage is 179 volts, so 200-volt breakdown (or more) devices are advisable. Moreover, in one embodiment transient absorbers, such as gas discharge transient suppressors, to catch voltages greater than the transistor breakdown voltages may be placed across the AC input, as indicated by component Z in FIG. 2. These transient absorbers prevent damage from abnormal surges, such as may be caused by lightning strikes to utility lines. The ON resistance (RdsON) of a 200 volt power MOSFET is typically in the 10 milliohm region, so the two MOSFETs of each switch give 20 milliohms for the whole switch. For lower RdsON, larger MOSFETs or multiple parallel devices can be used. The loss resistance should be lowest for the series switch (110) which is ON and passing normal current for the majority of the time, while the loss of the shunt switch, which operates only during a current limiting episode, is less important.

To open AC switch (110) the controller applies a voltage of zero to the gates of Q1 and Q2. Both Q1 and Q2 are now open, leaving only the back-to-back connected diodes D1 and D2. It will be realized that the back-to-back diodes cannot pass current in either direction, as D1 blocks current flow when the Live L of input (100) is positive, while diode D2 blocks current flow when it is negative. It may also be realized therefore that, to block current flow, only Q1 need be turned off when the AC input is positive and conversely only Q2 need be turned off when the AC input is negative. Thus controller (200) need not turn off Q1 and Q2 at exactly the same time. This is a feature of the invention, to avoid the above-mentioned simultaneity dilemma in attempting to synchronize switches (110) and (120) exactly.

When switch (110) is turned OFF, switch (120) shall be turned ON to catch the inductor back EMF. Typically, if the current is in-phase with the voltage, if switch (110) is turned OFF while the AC input is positive, the inductor voltage at the junction of switch (110) and (120) would fly negative, that is below neutral, in order to attempt to maintain current flow. This would be caught by diode D4 even with Q4 OFF, as long as Q3 was ON. Moreover, Q3 can indeed be ON when the AC input is positive as long as Q4 is OFF and D4 is thus blocking the flow of current to neutral. This renders it permissible to turn ON, ahead of time, that part of shunt switch (120) that is important to catch inductor flyback EMF when switch (110) is opened on a positive half cycle.

Now, the assumption that current is in-phase with voltage need not be made. If current was flowing in the negative direction while the AC input was positive, then opening switch (110) would result in the inductive flyback attempting to go highly positive. This would be clamped by D1 to the line input as long Q2 were still ON. Moreover, it is only necessary to turn Q1 OFF to interrupt fault current on a positive voltage half cycle of the input, therefore Q2 may indeed still be left ON. According to embodiments of the present invention, therefore, an effective strategy is to turn OFF Q1 to interrupt fault current on a positive input voltage half cycle while leaving Q2 turned ON, while Q4 is OFF and Q3 is already ON. Thus, both positive and negative inductor flyback voltages are clamped upon interrupting current on a positive half cycle, with D4 clamping a negative-going flyback spike to Neutral while D1 clamps a positive-going flyback spike to Line.

The opposite control is applied to interrupt a negative half cycle: on a negative half cycle, Q4 is turned on (with Q3 OFF) before turning off series switch (110), relying on D3 to block the path to neutral for the negative polarity, while clamping a positive inductor flyback spike to neutral. Switch (110) is turned OFF by leaving Q1 turned ON while turning OFF Q2, leaving D2 to block the flow of a negative input voltage while clamping a negative inductive flyback voltage to Line. Accordingly, switches (110) and (120) can be controlled, according to the inventive strategy described above, to interrupt a fault current without requiring absolute simultaneous operation.

The fault current interruption switch sequence is further clarified with the aid of the timing diagram in FIG. 3. The top trace in FIG. 3 is the sinusoidal AC source voltage of 120 volts RMS and 169 volts peak. The second trace from the top is the load current, which starts off at $t_0$ in phase with the voltage on the assumption that the net load is resistive. At $t_1$, a short circuit develops on the load output. The current then rises at a rapid rate given by dI/dt=V/L where L is the series inductor value. If the series inductor is 50 uH and the short circuit develops at an input voltage of, say, 150 volts, then the rate of rise of current is 3 amps per microsecond. At $t_2$, the current has risen to a threshold at which the device is desired to current limit, therefore, as shown by the third trace from the top, transistor Q1 is controlled to OFF. The inductor flyback voltage would shoot in the negative direction, but is clamped by D4 to a diode drop below neutral, or about −0.7 volts. It may be seen from the control traces of the respective transistors that from $t_0$ to $t_2$, Q2 and Q3 were already ON and so the circuit was already in a condition to clamp either a negative flyback voltage by virtue of D4 or a positive flyback voltage by virtue of D1. The latter would only have occurred if the inductor current had been in antiphase with the voltage. This could occur if, for example, the circuit was in use for backfeeding the output of a solar inverter to the grid.

Shortly after Q1 turns off, Q4 may turn on without danger of creating an L-to-N path across the input terminals. The main purpose of turning Q4 on is better to clamp a negative flyback voltage to neutral so as to avoid the loss in the 0.7 volt drop of Q4. With both Q3 and Q4 now ON, the voltage input to the inductor is zero and its current will decay in dependence of the voltage across it, which could be low with a dead short load. Therefore the rate of current decay after Q1 opened at $t_2$ is slow, and it takes a while for the current to drop below a second threshold at T2 at which Q1 may be switched ON again. Before Q1 is switched ON again however, Q4 must be switched OFF. Therefore reaching the threshold at T2 first causes Q4 to be turned OFF and shortly thereafter Q1 may be turned ON again without danger of creating a short circuit path from L to N of input (100). The delay between turning Q4 OFF and Q1 ON need only be of the order of 100 nS with fast MOSFETs, which can implemented with R-C delays, by logic clocked at 10 MHz, or by a microprocessor executing instructions in the appropriate sequence.

After turning OFF Q4 at T2 and turning Q1 ON again at $t_3$, the current resumes a rapid rise due to the still-present short circuit and again hits the limit value at $t_4$, causing Q1 to turn OFF again and Q4 to turn ON again shortly thereafter. This sequence repeats until T180 where the AC voltage changes from a positive half cycle to the start of a negative half cycle.

In the negative half cycle, the functions of Q1 and Q2 are exchanged and likewise the functions of Q3 and Q4 are exchanged. In FIG. 3, the circuit is already in a current limiting event at the input voltage zero crossing, with both Q3 and Q4 ON and Q1 OFF and Q2 ON. A transition shall now be made to Q2 OFF and Q1 ON while Q3 and Q4 both remain ON. Since the shunt switch (120) composed of Q3 and Q4 is ON, Q1 must not transition to ON before Q2 has transitioned to OFF in order to avoid creating a short circuit path between L and N of input (100), which timing again can be effected by logic or software or analog delays. Thus there must be a brief period around the zero crossing where both Q1 and Q2 are OFF, which is not a problem since in FIG. 3 Q3 and Q4 are both ON, clamping the inductor flyback to a definite potential (neutral). Regard must be paid however to the possibility that other transistor states than the above could exist at the voltage zero crossing. The possible states that could exist prior to the positive to negative zero crossing are shown in the table below:

| | State of: | Q1 | Q2 | Q3 | Q4 |
|---|---|---|---|---|---|
| 1 | e.g. T5 to T180 | OFF | ON | ON | ON |
| 2 | e.g. $t_5$ to $t_6$ | ON | ON | ON | OFF |
| 3 | e.g. $t_4$ to T3 | OFF | ON | ON | OFF |
| 4 | e.g. T5 to T180 | OFF | ON | ON | ON |

The first state in the above table was just dealt with above; Q2 must be turned OFF first at T180 and then Q2 turned ON after a short delay at T6.

In the second state in the table, which for example pertains between $t_5$ and $t_6$, since both transistors (Q1, Q2) of series switch (110) are ON, the states of Q3 and Q4 can be flipped from Q3=ON, Q4=OFF to Q3=OFF, Q4=ON providing Q3 turns OFF before Q4 turns ON.

In the 3rd state, only one transistor of each switch is ON with the other OFF, so the states of both switches must be flipped. If the states are flipped in such a way that there is a period with all transistors OFF, inductive current would have nowhere to go, potentially causing a damaging flyback-EMF spike. If Q4 is turned ON before Q3 is turned OFF, with Q2 still ON, a negative input voltage reaching the diode conducting threshold of D1 would result in a low impedance path from L to N of input (100). On the other hand, attempting to anticipate turning both Q3 and Q4 on before the voltage has becoming negative will result in a short circuit path, and even if Q2 is turned OFF, and if the voltage is still more than 0.7 volts positive, a short circuit path will be created. Fortunately, at 60 Hz, the time for a 169 volt peak sine wave to transition between +0.7 volts and −0.7 volts is 22 uS, which is relatively long, and therefore allows time to effect a benign transition. Moreover, while the voltage is positive, this state is a transition from state 3 to state 1 lasting only maybe 100 nS, while if the voltage becomes negative, it is a short transition state to a negative half cycle state of Q1=ON, Q2=OFF, Q3=ON, and Q4=ON. A simple strategy is thus to allow the already-begun transition to complete if a zero crossing occurs in the middle of it, and then to flip the states of Q1 and Q2 by passing through a state with both OFF while both Q3 and Q4 are ON and thus clamping inductive flyback.

In a processor implementation, events such as zero crossings or reaching a current threshold can be arranged to cause interrupts, and if a prior current threshold event had caused entry to transition state 3, the zero crossing interrupt would be inhibited until state 3 was exited and then the zero crossing action to flip transistor states would be taken.

FIG. 3 only shows events during a positive half cycle and the transition to a negative half cycle. The operation during a negative half cycle parallels that of the positive half cycle with the control functions of Q1 and Q2 interchanged and likewise the control functions of Q3 and Q4 interchanged.

FIG. 4 shows an exemplary circuit diagram of an inventive fault current limiter. Line and Neutral enter source input (100) and the Line passes through one half of double-pole circuit breaker (200) to source protection components comprised of gas discharge tranzorb Z and filter capacitor C1 shunted by damping (C3 in series R1). The surge-protected power is then passed through MOSFET transistors Q1, Q2 arranged as a series AC switch to rate-of-rise limiting inductor L, which forms a damped low-pass filter with shunt capacitor C2 and damping (C4 in series with R2). The power from the low pass filter (L, C2, C4, R3) then passes through the second half of double-pole circuit breaker (200) to load output (150).

Transistors Q3, Q4 form the shunt AC switch and all four transistors (Q1, Q2, Q3, Q4) are controlled by microcontroller IC1 via isolating gate drivers (IC2, IC3) such as Silicon Labs part number Si8235. A power supply (500) generates a 5 v logic supply for the microcontroller relative to its ground, which may or may not be the main system ground, and two gate drive supplies of about 12 volts relatively isolated from each other, and from the microcontroller supply if its ground is the main system ground or other potential different than one of the gate drive supplies. It may be noted that, if the microcontroller ground is the main system ground, then the whole device would need an input connection for ground as well as Neutral and Line. It is known from the art of GFCI and AFCI breakers to provide input Neutral to such breakers by means of a "pigtail," but they do not usually also have ground pigtail. It is a matter of choice, if the invention is configured as a replacement type of breaker, whether the microprocessor ground is connected to system ground by means of a ground pigtail as well as a neutral pigtail, or connected to something else such as Neutral, thereby avoiding the second (ground) pigtail.

Microcontroller (IC1) receives the output of Hall Effect current sensor (130) on pin 20. The indicated microcontroller is an AVR AT-TINY. Pin 20 of the AT Tiny can be configured as an AtoD converter input which could measure the current from an analog current sensor (130), but is unlikely to be able to do so fast enough for fault current limiting. Alternatively, pin 20 can be configured as an interrupt input, and in that case current sensor (130) would be configured to provide a digital output level when the current exceeded the desired current limiting threshold, and the complementary digital output level when the current fell below a second threshold equal to or lower than the first threshold. When microcontroller IC1 receives the digital level corresponding to maximum allowed fault current, whatever program is running is immediately interrupted and a software branch is made to the pin 20 interrupt routine. The pin 20 interrupt routine then reads pin 19, which receives a 60 Hz signal from PSU (500) indicating whether the interrupt occurred during a positive or a negative half cycle. Accordingly, either the sequence for interrupting negative half cycle current or positive half cycle current is performed. Pin 19 can also be configured as an interrupt pin, so that if a zero crossing occurs on the sync line from PSU (500) a pin 19 interrupt routine can be executed for changing the transistor gate signals according to the above table and associated discussion above. Various generations of the AT Tiny microcontroller include internal memory, such as flash memory, EEPROM, and/or SRAM. Although not depicted in FIG. 4, those of skill in the art are aware that in some applications, this or another microcontroller may require external memory or other peripheral circuits, as well known in the art.

Using a 10 MHz microcontroller clock crystal, the AT Tiny is able to execute between 5 and 10 instructions in 1 uS, and is therefore able to shut off the series switch and turn on the shunt switch in time to prevent excessive current build-up in inductor L when a heavy short circuit occurs on the load side. When the current falls after interrupting it, pin 20 will again cause a pin-change interrupt that will cause the microcontroller to control transistors Q1, Q2, Q3, Q4 to once more allow current to pass to the load through inductor L, thus resulting in an oscillation that maintains the current around the limiting value by virtue of the ON/OFF mark space ratio. The current though the load side breaker-half will be the limited fault current, while the mean current through the input breaker-half will be very much less due to the low ON/OFF ratio during limiting. If however the limiting current is greater than the load half-breaker trip level, it will trip out after a predetermined time and pull the input half-breaker with it, to remove power from the whole circuit. The breaker would then need to be manually reset in order restore power once the short circuit has been cured.

It is known in the art of electrical systems to coordinate the trip characteristics of upstream and downstream breakers so that a fault on a downstream branch circuit trips only its associated breaker and not the upstream breaker, which would remove power from other branch circuits not in a fault condition. One such system is the Zone Selective Interlocking (ZSI) standard, described for example in IEEE standard C37.234-2009 "IEEE Guide for Protective Relay Applications to Power System Buses," § 7.2. Since the operation of an inventive fault-current limiter as just described uses a conventional breaker to stop the limited fault current, the breaker will retain any coordination characteristics with downstream breakers.

It is envisaged that the inventive fault current limiter could be placed in the service entrance panel and used to feed sub-panels, which would then be protected from excessive fault currents. Two arrangements such as FIG. 4 would be used to obtain a double-pole fault current limiter protecting both L1 and L2 hot legs of a split-phase supply. A typical feeder breaker for a sub-panel might be 100 amps, for example. A fault current limit of perhaps twice that could be set, i.e. 200 amps, which is much lower than the 5000 amps which could otherwise be seen at the sub-panel, and, being twice the feeder breaker trip level, would guarantee that the 100 amp breaker would trip in about 1 second. If a faster trip is desired, the microcontroller can be arranged to provide a signal after any desired time to a suitably adapted breaker (200) which would activate its trip circuit earlier, tripping at 200 amps in perhaps around half a cycle (8 mS). The criterion for the microprocessor issuing a trip command to the breaker could be arranged to be user settable by a suitable potentiometer connected to one of the microprocessor AtoD conversion pins, for example pin 18.

Although FIG. 4 depicts one exemplary embodiment of the present invention, those of skill in the art will readily recognize that it is not limiting, and the inventive concepts disclosed herein may be implemented in a variety of ways. For example, the controller (200) may comprise any controller operative to effect the relative transistor switching timing disclosed herein. The controller (200) may comprise a microcontroller or microprocessor, together with appropriate software, as depicted in FIG. 4 and described above. However, it may alternatively comprise a state machine implemented by discrete logic, programmable logic together with appropriate firmware, or the like.

It has been disclosed herein how a robust, semiconductor, instantaneous fault-current limiting device can be constructed and used to protect downstream equipment form excessive fault currents that are let through when using electro-mechanical circuit breakers. Because the inventive fault current limiter uses energy conserving switch-mode techniques, there is not a heat dissipation issue, and furthermore it prevents upstream equipment from seeing the overload. These advantages are achieved by the inventive combination of components and by the inventive transistor control strategies disclosed above, which may be adapted by persons of ordinary skill in the art without departing from the spirit and practice of the invention as described by the attached claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A fault current limiting circuit operative to limit an instantaneous fault current, let through from an alternating current source to a load, to a maximum desired value under fault conditions, comprising:
   an inductor in series with a current path from source to load operative to limit a rate of rise of current under fault conditions;

a first semiconductor switch in series with the current path from source to load comprising two series transistors connected in reverse and configured to be independently controlled to close and pass alternating current with low voltage drop, or to open to block alternating current flow from said alternating current source;

a second semiconductor switch in shunt with the current path from said source to said load comprising two series transistors connected in reverse and configured to be independently controlled to maintain current flow through said inductor in one or both of a first direction and a second direction, when said first semiconductor switch is opened, thereby limiting the development of inductor flyback voltages;

a current sensor operative to sense instantaneous current flowing through said inductor and further operative to output a signal indicative of the instantaneous current; and a controller operative to receive said output signal from said current sensor and determine a fault condition exists, and further operative to independently control the two transistors of each of said first semiconductor switch and said second semiconductor switch to close said first semiconductor switch and open said second semiconductor switch in the absence of a fault condition so as to pass current from the source to the load, and to limit fault current to a predetermined value when a fault condition exists, by repetitively, and oppositely, opening and closing said first semiconductor switch and said second semiconductor switch in a sequence to control the mean current flow.

2. The fault limiting device of claim 1, wherein the inductor is further operative to limit high frequency electrical signal components.

3. The fault current limiting device of claim 1, further comprising one or more shunt capacitors and damping resistors associated with one or both of the input from said source and the output to said load, to limit the export of high frequency electrical signals produced by said repetitive opening and closing of said first semiconductor switch.

4. The fault current limiting device of claim 1 wherein said current sensor is a Hall Effect device.

5. The fault current limiting device of claim 4 wherein said Hall Effect device senses a magnetic field produced in a magnetic core of said inductor.

6. The fault current limiting device of claim 1 wherein said current sensor is operative to output to said controller a logic signal of a first logic level when the sensed current exceeds a desired maximum fault current.

7. The fault current limiting device of claim 1 wherein said current sensor is operative to output to said controller a logic signal of a second logic level when the sensed current does not exceed a desired maximum fault current.

8. The fault current limiting device of claim 1 wherein said controller comprises a microcontroller executing software instructions and wherein said current sensor causes an interrupt of the software instruction sequence when the sensed fault current exceeds said maximum desired value.

9. The fault current limiting device of claim 1 further comprising a transient surge absorber associated with a power input from said alternating current source, and operative to limit peak voltages at said first semiconductor switch.

10. The fault current limiting device of claim 1 wherein said first and second semiconductor switches each comprise a pair of MOSFETs series connected source-to-source.

11. The fault current limiting device of claim 1 wherein said first semiconductor switch comprises a pair of MOSFETs series connected source-to-source or drain-to-drain and said controller is operative to control the two MOSFETs of said first semiconductor switch such that only one MOSFET is initially switched OFF to open the switch and limit the fault current on a positive half cycle of the input AC voltage, and only the other MOSFET is initially switched OFF to open the switch and limit the fault current on a negative half cycle of the input AC voltage.

12. The fault current limiting device of claim 1 wherein said second semiconductor switch comprises a pair of MOSFETs series connected source-to-source or drain-to-drain and said controller is operative to control the two MOSFETs of said second semiconductor switch such that only one MOSFET is initially switched ON to close the switch and catch inductor flyback voltage when said first semiconductor switch is opened on a positive half cycle of the input AC voltage, and only the other MOSFET is initially switched ON to close the switch and catch inductor flyback voltage when said first semiconductor switch is opened on a negative half cycle of the input AC voltage.

13. The fault current limiting device of claim 1 wherein said first and second semiconductor switches each comprise a pair of MOSFETs series connected source-to-source or drain-to-drain and said controller is operative to control the two MOSFETs of said first semiconductor switch to be ON and is operative to control the two MOSFETs of said second semiconductor switch to be OFF when inductor current sensed by said current sensor is below said maximum desired value.

14. The fault current limiting device of claim 1 further comprising an electro-mechanical circuit breaker in series with the output current path to said load, the circuit breaker operative to interrupt the current path to the load when the current has been limited during a fault condition to said maximum desired value for greater than a predetermined time.

15. The fault current limiting device of claim 1 further comprising a mechanically-linked, two-pole, electro-mechanical circuit breaker having one half in series with the output current path to said load and the other half in series with the input from said alternating current source, the circuit breaker operative to interrupt the current path to the load when the current has been limited during a fault condition to said maximum desired value for greater than a predetermined time, and via a mechanical linkage between the two poles of said two-pole breaker, is also operative to interrupt the input from said alternating current source, to await a reset.

16. A method of limiting instantaneous fault current in an electrical power supply circuit between an alternating current (AC) source and a load, comprising:
    providing an inductor in series with a current path from source to load operative to limit a rate of rise of current under fault conditions;
    sensing an instantaneous current flowing through the inductor;
    if the instantaneous current exceeds a maximum desired value,
        independently controlling two series transistors forming a switch in series with the inductor to block current flow from the source; and
        independently controlling two series transistors forming a shunt switch between the inductor and a current return path to the source to maintain current flow through the inductor when the series switch is opened, thereby limiting the development inductor flyback voltages;

wherein the switch actuations are timed such that the switches are never simultaneously both open or both closed.

17. The method of claim 16 further comprising, after opening the series switch and closing the shunt switch, and when the instantaneous current no longer exceeds the maximum desired value,
   closing the series switch to allow current flow from the source; and
   opening the shunt switch;
   wherein the switch actuations are timed such that the switches are never simultaneously both open or both closed.

18. The method of claim 17 further comprising:
   repeatedly cycling through the method so as to limit the current to values close to the maximum desired value, for a predetermined duration; and
   after the predetermined duration, holding the series switch open so as to halt further current flow until reset.

19. The method of claim 17 wherein the series switch and the shunt switch each comprise at least two series-connected transistors, such that the switch is open if either transistor is OFF and is closed only when both transistors are ON, and wherein opening and closing the switches comprises selectively, separately turning the transistors in each switch ON or OFF, so as to achieve the limitation that the switches are never both open or both closed without requiring precise synchronicity in actuating the switches.

20. The method of claim 19 wherein opening the series switch comprises only initially switching OFF one transistor to open the switch on a positive half cycle of the input AC voltage, and only initially switching OFF the other transistor to open the switch on a negative half cycle of the input AC voltage.

21. The method of claim 19 wherein closing the shunt switch comprises only initially switching ON one transistor to close the switch when the series switch is opened on a positive half cycle of the input AC voltage, and only initially switching ON the other transistor to close the switch when the series switch is opened on a negative half cycle of the input AC voltage.

* * * * *